United States Patent
Garbow et al.

(10) Patent No.: US 8,069,139 B2
(45) Date of Patent: *Nov. 29, 2011

(54) TRANSITIONING OF DATABASE SERVICE RESPONSIBILITY RESPONSIVE TO SERVER FAILURE IN A PARTIALLY CLUSTERED COMPUTING ENVIRONMENT

(75) Inventors: Zachary A. Garbow, Rochester, MN (US); Robert H. Hamlin, Mantorville, MN (US); Clayton L. McDaniel, Rochester, MN (US); Kenneth J. Trisko, Stewartville, MN (US)

(73) Assignee: International Business Machines Corporation, Armonk, NY (US)

( * ) Notice: Subject to any disclaimer, the term of this patent is extended or adjusted under 35 U.S.C. 154(b) by 422 days.

This patent is subject to a terminal disclaimer.

(21) Appl. No.: 12/354,176

(22) Filed: Jan. 15, 2009

(65) Prior Publication Data

US 2009/0119306 A1    May 7, 2009

Related U.S. Application Data

(63) Continuation of application No. 11/278,058, filed on Mar. 30, 2006, now Pat. No. 7,496,579.

(51) Int. Cl.
*G06F 7/00* (2006.01)
*G06F 11/07* (2006.01)

(52) U.S. Cl. ....... 707/609; 707/803; 714/4.11; 714/4.21

(58) Field of Classification Search .................. 707/609, 707/782, 803; 714/4.11, 4.21
See application file for complete search history.

(56) References Cited

U.S. PATENT DOCUMENTS

| | | | |
|---|---|---|---|
| 5,522,044 A | 5/1996 | Pascucci et al. | |
| 6,292,905 B1 | 9/2001 | Wallach et al. | |
| 6,490,610 B1 | 12/2002 | Rizvi et al. | |
| 6,496,949 B1 | 12/2002 | Kanevsky et al. | |
| 6,728,748 B1 | 4/2004 | Mangipudi et al. | |
| 6,920,580 B1 | 7/2005 | Cramer et al. | |
| 6,980,988 B1 | 12/2005 | Demers et al. | |
| 6,996,581 B2 | 2/2006 | Houston et al. | |
| 7,093,293 B1 | 8/2006 | Smithson et al. | |

(Continued)

OTHER PUBLICATIONS

"Backup Email Server Service", archived at archive.org on 05/094/2005, LaneChange.net, 2 pgs.
"Oracle9i Database Administrator's Guide", archived at archive.org on Feb. 5, 2005, Oracle, Release 1 (9.0.1), 36 selected pgs.
Office Action for U.S. Letters Patent No. 7,496,579 B2, dated Feb. 19, 2008.

(Continued)

*Primary Examiner* — Shahid Alam
*Assistant Examiner* — James E Richardson
(74) *Attorney, Agent, or Firm* — Heslin Rothenberg Farley & Mesiti, PC; James R. Nock

(57) ABSTRACT

A facility is provided for transitioning a database service from a failing, primary server to another server of a computing environment including a plurality of servers, at least some of which have a common database service capability, but not commonly replicated supporting databases. The facility includes, responsive to detection of failure at the primary server, selecting another server of the plurality of servers to function as database service backup for the primary server, updating at least one configuration file of the computing environment to indicate that the another server is to function as database service backup for the primary, failing server, and dynamically creating at least one database structure at the another server. The dynamically created at least one database structure supports the database service backup function at the another server and corresponds to a database structure of a database supporting the database service at the primary server.

14 Claims, 7 Drawing Sheets

U.S. PATENT DOCUMENTS

| | | | |
|---|---|---|---|
| 7,353,257 B2 | 4/2008 | Pettigrew et al. | |
| 7,451,446 B2 | 11/2008 | Noll et al. | |
| 7,461,376 B2 | 12/2008 | Geye et al. | |
| 7,496,579 B2 | 2/2009 | Garbow et al. | |
| 2001/0003830 A1 | 6/2001 | Nielsen | |
| 2003/0172163 A1 | 9/2003 | Fujita et al. | |
| 2003/0187972 A1 | 10/2003 | Bauchot | |
| 2003/0191829 A1 | 10/2003 | Masters et al. | |
| 2004/0010544 A1 | 1/2004 | Slater et al. | |
| 2004/0078697 A1 | 4/2004 | Duncan | |
| 2004/0123180 A1 | 6/2004 | Soejima et al. | |
| 2004/0172574 A1 | 9/2004 | Wing et al. | |
| 2005/0050392 A1 | 3/2005 | Baba et al. | |
| 2005/0055695 A1 | 3/2005 | Law et al. | |
| 2005/0268145 A1 | 12/2005 | Hufferd et al. | |
| 2006/0026250 A1 | 2/2006 | Ito et al. | |
| 2006/0179220 A1 | 8/2006 | Soejima et al. | |
| 2007/0233865 A1 | 10/2007 | Garbow et al. | |
| 2008/0201474 A1 | 8/2008 | Yamada | |
| 2008/0235533 A1 | 9/2008 | Hatasaki et al. | |
| 2009/0164998 A1 | 6/2009 | Stevens et al. | |

OTHER PUBLICATIONS

Office Action for U.S. Letters Patent No. 7,496,579 B2, dated Jul. 11, 2008.

Notice of Allowance for U.S. Letters Patent No. 7,496,579 B2, dated Oct. 7, 2008.

Office Action for U.S. Appl. No. 11/278,019 (U.S. Patent Publication No. 2007/0233865 A1 ), dated Dec. 12, 2008.

Office Action for U.S. Appl. No. 11/278,019 (U.S. Patent Publication No. 2007/0233865 A1 ), dated Jun. 17, 2009.

Martin et al., "A Framework for Dynamic Byzantine Storage", Computer Society, IEEE, Proceedings of the 2004 International Conference on Dependable Systems and Networks (DSN'04) (2004).

Xhafa et al., "Dynamic Priority Queueing of Handover Calls in Wireless Networks: An Analytical Framework", IEEE Journal on Selected Areas in Communications, vol. 22, No. 5, pp. 904-916 (Jun. 2004).

Ortigoza-Guerrero et al., "A Prioritized Handoff Dynamic Channel Allocation Strategy for PCS", IEEE Transactions on Vehicular Technology, vol. 48, No. 4, pp. 1203-1215 (Jul. 1999).

TRANSITIONING OF DATABASE SERVICE RESPONSIBILITY RESPONSIVE TO SERVER FAILURE IN A PARTIALLY CLUSTERED COMPUTING ENVIRONMENT

CROSS-REFERENCE TO RELATED APPLICATIONS

This application is a continuation of co-pending U.S. patent application Ser. No. 11/278,058, filed Mar. 30, 2006, entitled "Transitioning of Database Service Responsibility Responsive to Server Failure in a Partially Clustered Computing Environment", by Garbow et al., the entirety of which is hereby incorporated herein by reference. This application also contains subject matter which is related to the subject matter of the following commonly assigned application, which is hereby incorporated herein by reference in its entirety:

"Dynamically Adjusting Operating Level of Server Processing Responsive to Detection of Failure at a Server", by Garbow et al., U.S. Ser. No. 11/278,019, filed Mar. 30, 2006, and published Oct. 4, 2007 as U.S. Patent Publication No. 2007/0233865 A1.

TECHNICAL FIELD

The present invention relates in general to server processing within a computing environment, and more particularly, to a facility for transitioning database service responsibility from a primary database server to another database server of a computing environment responsive to detection of a failure at the primary server, and without pre-designating the another database server as backup for the primary server or predefinition of one or more database structures supporting the database service at the another server.

BACKGROUND OF THE INVENTION

A computing environment wherein multiple servers have the capability of sharing resources is referred to as a cluster. A cluster may include multiple operating system instances which share resources and collaborate with each other to process system tasks. Various cluster systems exist today, including, for example, the RS/6000 SP system offered by International Business Machines Corporation.

Within a typical cluster, redundant hardware and software are used to provide replicas on a backup server(s) of each database on an associated primary server, such that clustered servers are exact duplicates of another server. This clustered environment today forms the basis for high availability computing. In the event of a primary server failover, a user's data request is transparently routed to the clustered (i.e., backup) server, allowing the user to access the appropriate data without even realizing that the primary server has failed.

One problem with maintaining exact duplicates of servers and their databases within a computing environment is the obvious cost disadvantage of requiring currently maintained, redundant databases supporting one or more database services.

Thus, there is a need for techniques, responsive to failure at a primary database server, to dynamically transition database service responsibility from the failing server to another database server of a computing environment without pre-requiring maintenance of redundant databases at the primary and backup servers.

SUMMARY OF THE INVENTION

The shortcomings of the prior art are overcome and additional advantages are provided through the provision of a system for transitioning a database service from a failing server to another server of a computing environment is provided. The computing environment includes a plurality of database servers. The system includes a processor, a memory, and: means for selecting another server of the computing environment to function as database service backup for a primary server upon detecting a failure at the primary server of the computing environment; means for updating at least one configuration file of the computing environment to indicate that the another server is to function as database service backup for the primary server; and means for dynamically creating, subsequent to the selecting of the another server, at least one database structure at the another server to function as database service backup. The dynamically created at least one database structure supports the database service backup function at the another server, and corresponds to at least one database structure of a database supporting the database service function at the primary server.

In a further aspect, at least one program storage device is provided readable by a computer, tangibly embodying at least one program of instructions executable by the computer to perform a method of transitioning a database service from a failing server to another server of a computing environment. The computing environment includes a plurality of database servers. The method performed includes: responsive to detecting failure at a database server of the computing environment, selecting another database server of the computing environment to function as database service backup for the failing server; updating at least one configuration file of the computing environment to indicate that the another server is to function as database service backup for the failing server; and subsequent to selecting of the another server, dynamically creating at least one database structure at the another server to function as database service backup, the dynamically created at least one database structure supporting the database service backup function at the another server and corresponding to at least one database structure of a database supporting the database service function at the primary server.

Further, additional features and advantages are realized through the techniques of the present invention. Other embodiments and aspects of the invention are described in detail herein and are considered a part of the claimed invention.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

BEST MODE FOR CARRYING OUT THE INVENTION

Figure 1:
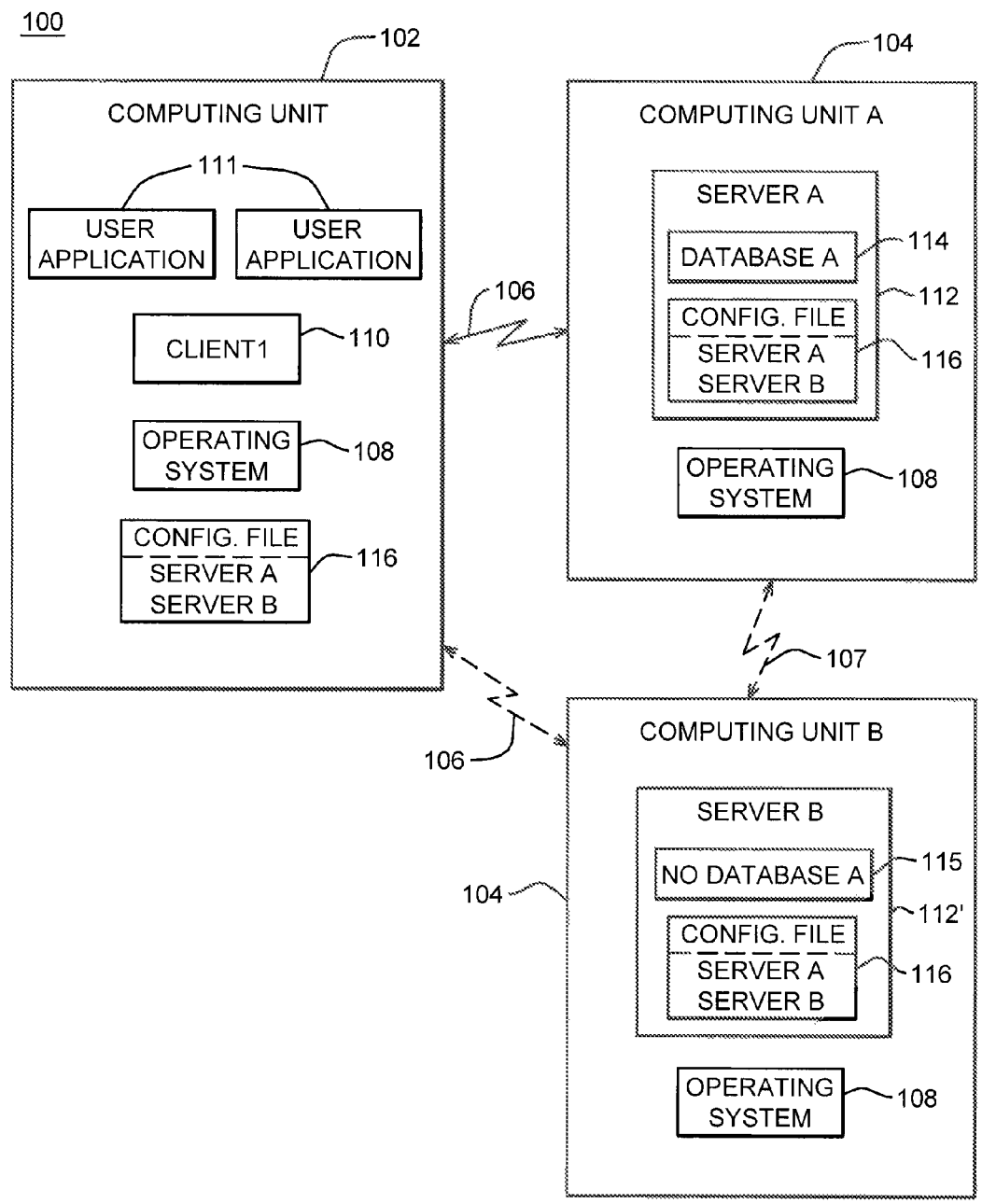
FIG. 1 depicts one embodiment of a computing environment to incorporate and use one or more aspects of the present invention.

Generally stated, provided herein is an autonomic facility for dynamically transitioning a database service from a failing database server to another database server within a computing environment comprising a plurality of servers. The plurality of servers are "partially clustered", meaning that, for example, there are multiple database servers having a common database service capability, but not commonly replicated databases supporting the database service. The environment is distinct from a typical clustered environment wherein redundant servers are pre-designated as backup to a primary database server, and the redundant servers are provided with a currently mirrored copy of the database supporting the database service at the primary server.

A priority list of database servers is maintained within the computing environment, for example, in association with at least one configuration file of the computing environment. This priority list of servers identifies one or more database server(s) having the common database service capability. When a primary server fails, the priority list is automatically employed to identify another database server (i.e., a dynamically determined backup server) for the failing primary server. Once the database server to function as database service backup is selected, the at least one configuration file of the computing environment is updated to indicate that this server is functioning as database service backup for the primary failing server, and thereafter at least one database structure is dynamically created at the backup server. This at least one database structure supports the database service at the backup server and corresponds to a database structure of a database at the primary failing server supporting the database service. The database service might include, for example, depositing or reading data, executing one or more applications, providing electronic mail routing capabilities, etc.

Before describing various implementations of the autonomic facility, the following terms are defined for use herein.
  Database—includes database structures and data content. The database structures (or data structures) are organized so that the data content can be readily deposited, accessed, managed and updated.
  Database Service—the database functionality, including reading data from and writing data to the database. An e-mail database service includes, for example, sending and receiving data into inboxes and folders for multiple users of the database. In another example, a relational database is used for storing records, and includes functionality for allowing the records to be accessed in a number of different ways.
  Database Structure—the data structure or building blocks of the database. In one implementation, a database comprises a plurality of database structures. The database structures comprise the organization of the database without any data. For example, a database structure contains definitions or schema used to organize the end user data that will be deposited into the database. The database structure may define a logical record (e.g., as name 30 characters, address 30 characters, age integer, social security integer xxx-xx-xxxx), and also define forms and pages (e.g., GUI layouts used in the database and database service).
  Config. File (or Configuration File)—at least one configuration file of the computing environment is employed to identify the location of database servers of the computing environment providing particular database services. For example, when a primary database server fails, the configuration file is used to identify another server providing a common database service. The configuration file might include an identification of the location of any temporarily created databases, referred to herein as partial databases or database structures with data content, indicating on which database server in the computing environment the partial database resides. By way of specific example, the configuration file might comprise a Lotus Notes Domino Directory, offered by International Business Machines Corporation. This Domino Directory can be used to define mail servers and user mail file locations. With the Directory, clients can check the configuration files, as can servers and routers as needed to deposit and/or access data in a database.
  Priority List of Servers—a prioritized list of available database servers of the computing environment which can be employed upon detection of failure at a primary database server. The configuration file and priority list of servers can be maintained separately, or in a common entity within the computing environment.

Figure 2:
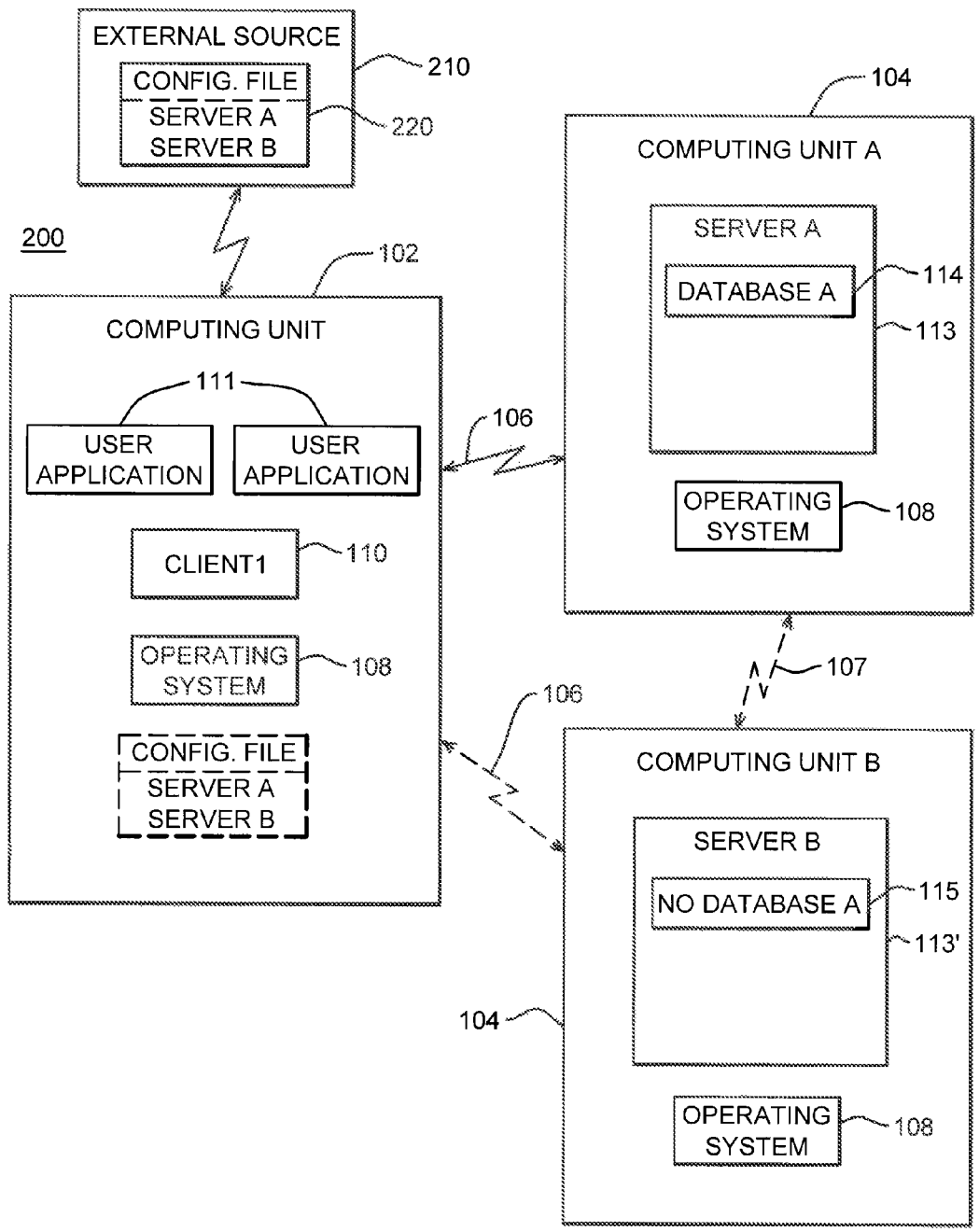
FIG. 2 depicts another embodiment of a computing environment to incorporate and use one or more aspects of the present invention.

The facility presented herein for transitioning a database service from a failing server to another server is applicable to different types of computing environments, two examples of which are provided in FIGS. 1 & 2. In both examples, the computing environment is deemed a partially clustered environment wherein two or more database servers are provided having a common database service capability, but not a mirrored supporting database.

FIG. 1 depicts a computing environment 100 which includes, for instance, a computing unit 102 coupled to two or more partially clustered, database computing units A & B 104 via connections 106. Computing unit A and computing unit B are themselves connected via a connection 107. Each computing unit includes, for example, a personal computer, a laptop, a workstation, a mainframe, a mini-computer, or any other type of computing unit. Computing unit 102 may or may not be the same type of unit as database computing units 104. The connections 106 & 107 coupling the units are wire connections or any type of network connections, such as a local area network (LAN), wide area network (WAN), token ring, Ethernet connections, Internet connections, etc. Connections 106 & 107 may be the same or different types of connections.

In one example, each computing unit executes an operating system 108, such as, for instance, the z/OS operating system, offered by International Business Machines Corporation, Armonk, N.Y.; a UNIX operating system; Linux; Windows; or any other operating systems. The operating system of one computing unit may be the same or different from another computing unit. Further, in other examples, one or more of the computing units may not include an operating system.

In one embodiment, computing unit 102 includes a client application (a/k/a, a client) 110 which is coupled to a server application (a/k/a, a server A) 112 on computing unit A 104. As one example, client 110 communicates with server A 112 via, for instance, a Network File System (NFS) protocol over a TCP/IP link coupling the applications. Further, on at least one computing unit 102, one or more user applications 111 are executing.

Within server A 112 of computing unit A 104, a database A 114 is provided, as well as a Config. File 116. As shown, Config. File 116 lists server A and server B as database servers of the computing environment capable of providing a particular database service (e.g., an e-mail service). In this implementation, Config. File 116 is replicated at server B 112 of computing unit B 104, as well as computing unit 102 hosting client1 110. Thus, with reference to the Config. File, client1 110 determines that server A is the primary database server providing the database service and sends data across connection 106 for deposition in database A 114 associated with server A 112. Connection 106 between computing unit 102 and computing unit B 104, and connection 107 between computing unit B 104 and computing unit A 104 are shown dashed in FIG. 1 since database data primarily flows between computing unit 102 and computing unit A 104 when server A 112 is operational. That is, under normal operation, client1 110 employs server A to provide the desired database service, and to maintain its own copy of the Config. File 116 updated. Upon a failure to connect to server A 112, client1 110 reads the Config. File 116 and employs a selected alternate database server, server B in this example, for the database service (discussed below with reference to FIG. 3).

FIG. 2 depicts an alternate computing environment and implementation, generally denoted 200, wherein the Config. File 220 resides within an external source 210, rather than within server A 113 and server B 113' of computing units A & B 104. In this example, server A 113 includes a database A 114, but not the Config. File 116, while server B 113' does not include a mirrored copy of database A 115, nor the Config. File. Otherwise, the computing environment is the same or similar to that described above with reference to FIG. 1. Under normal operation, client1 110 employs server A 113, and database A 114 associated therewith for the given database service. Upon failure of server A, client1 employs the Config. File 220 from external source 210 to ascertain another server providing the database service for the client in this partially clustered environment. By way of example, the external source 210 might comprise the Tivoli Monitoring 5.1 for Messaging and Collaboration and/or the Tivoli Monitoring 5.1 for Web Infrastructure products offered by International Business Machines Corporation. Config. File 220 can be retrieved in advance of a failure at server A 113, or can be retrieved responsive to failure at server A.

Figure 3:
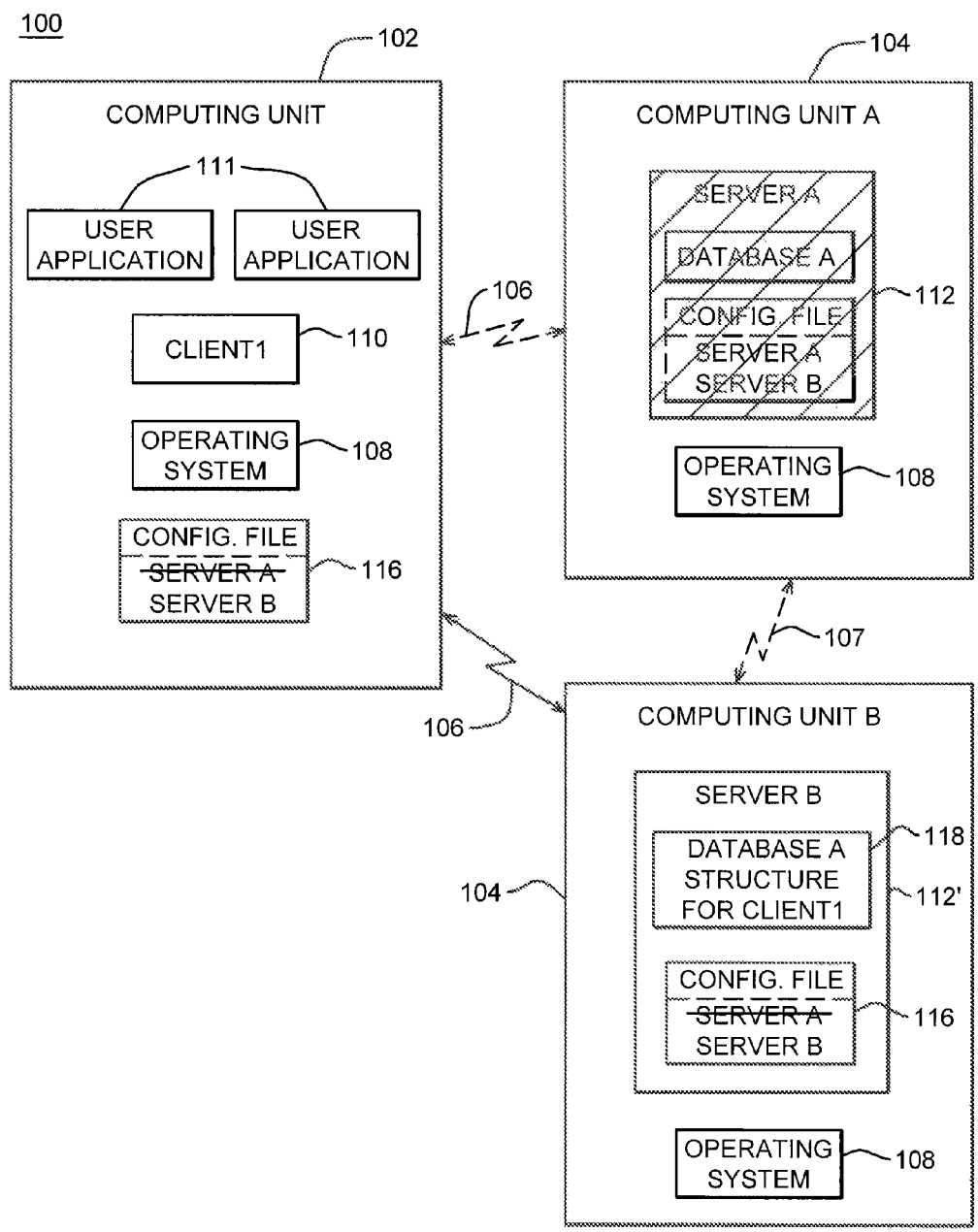
FIG. 3 depicts the computing environment embodiment of FIG. 1 after transitioning of a database service function from a failing database server (server A) to another database server (server B) of the computing environment, in accordance with one or more aspects of the present invention.

FIG. 3 depicts the computing environment 100 of FIG. 1, and illustrates failure at server A 112 of computing unit A 104. In this figure, client1 110 of computing unit 102 has ascertained the failure of server A 112 at computing unit A 104, referenced the Config. File 116 maintained at computing unit 102, selected server B 112' of computing unit B 104 to function as database service backup for the failing server A. As noted with respect to FIG. 1, server B 112' does not maintain a copy of database A employed by server A 112 in providing the database service. Rather, after failover to server B occurs, at least one database A structure 118 for client1 is dynamically created at server B 112' as needed to allow depositing of data from client1. This database A structure 118 supports the database service and corresponds to a database structure of database A supporting the database service at failing server A. For example, the dynamically created database A structure 118 may be created from a template, and define a logical record corresponding to a logical record of database A employed by server A.

FIGS. 4-7 depict one embodiment of logic for implementing the autonomic facility presented herein for transitioning a database service from a failing database server to another database server of a computing environment.

Figure 4:
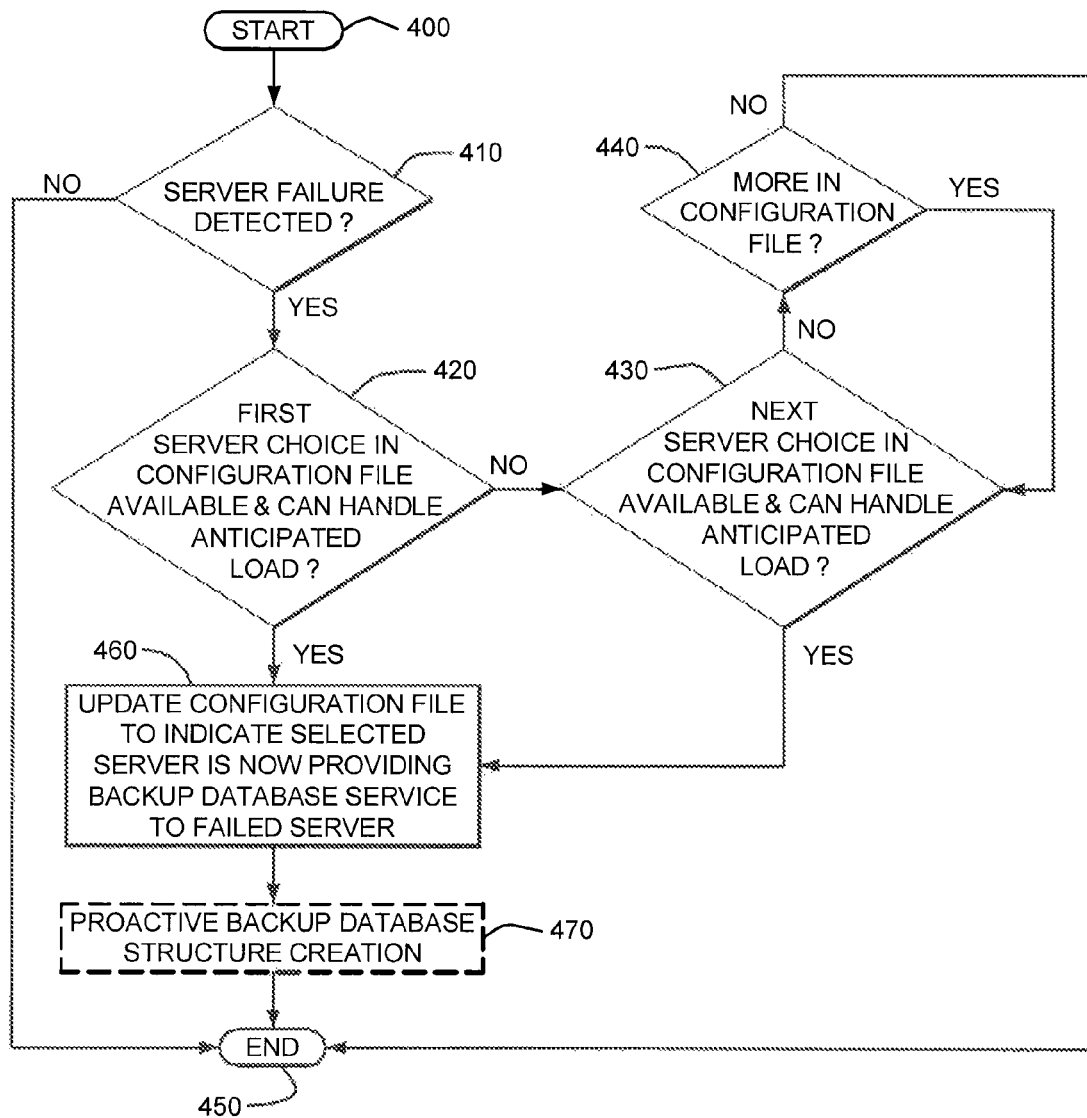
FIG. 4 depicts one embodiment of logic for selecting another server of the computing environment to function as database service backup of a failing database server, in accordance with one or more aspects of the present invention.

The server selection logic of FIG. 4 begins 400 with detecting failure at a primary server providing a database service 410. If there is no failure, then the selection logic terminates 450. Once failure at the primary server is detected 410, the logic determines a first backup server choice, for example, identified in the Config. File, or the priority list of database servers, and determines whether that first server choice is available and can handle the anticipated processing load resulting from functioning as database service backup for the primary failing server 420. By way of example, anticipated load can be determined by looking at the number of users accessing Server A, along with the resources required by Server A, and comparing that to other servers. Suppose Server A serves an average of 1,000 users between 9:00 AM and 5:00 PM. Suppose Server B is running at 95% CPU capacity between 9:00 AM and 5:00 PM, and it is determined through the art that the final 5% of CPU will only sufficiently serve an additional 100 users. In this case, Server B is not a good candidate to provide backup services for all of Server A's databases. However, it could provide service for some of the databases.

If the first server choice is unavailable, or cannot handle the anticipated processing load, then a next server choice (in the Config. File or the priority list of servers) is evaluated to determine if it is available and can handle the anticipated processing load 430. This process continues until another server of the computing environment is selected to function as database service backup for the failing server to support one or more clients or end users, or until the logic has reached the end of the Config. File (or priority list of servers) 440 identifying database servers of the computing environment capable of providing the database service backup. If no other server is available, or can handle the anticipated processing load, then the logic terminates 450.

Assuming that another server is selected, then the configuration file (i.e., Config. File) is updated to indicate that the selected server is now providing database service backup for the failed server 460. One or more configuration files can be disposed within the computing environment, as illustrated above in connection with FIGS. 1 & 2, each requiring updating.

Figure 5:
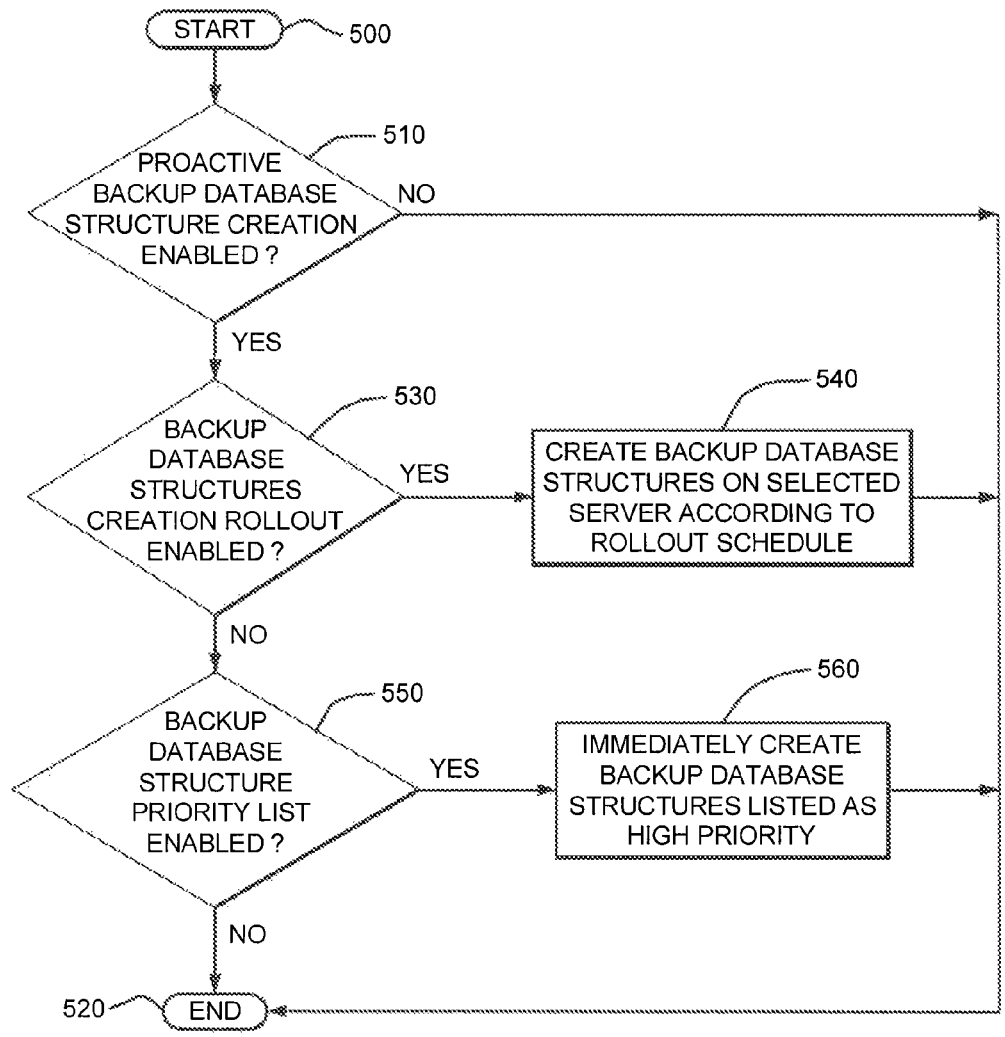
FIG. 5 depicts one embodiment of logic for proactively creating one or more database structures at the another server corresponding to one or more structures of a database supporting the database service function at the failing server, in accordance with one or more aspects of the present invention.

Next, if desired, proactive backup database structure creation 470 can be undertaken. One embodiment for proactively creating one or more data structure at the selected server to function as database service backup is illustrated in FIG. 5 and described below. After the optional proactive database structure creation, the server selection process is complete 450.

By way of illustration of the logic of FIG. 4, consider the following two specific examples. In these examples, it is assumed that the database service is an e-mail service, and that client1 and client2 have electronic mail files that reside on server C under normal operation. Server C has failed over, and the autonomic facility described herein is employed to create a partial database (i.e., one or more database structures) on a selected server (e.g., server A).

EXAMPLE 1

Two different files are used. Prioritylist.ini is a file that contains a list of which database servers are available to act as backup. Note that the 'backup' server can be a server that is a primary server for another set of users. ConfigFile.ini is a file that contains the identification of the selected backup server(s), i.e., the location of newly created partial databases upon failure of Server C.

PriorityList.ini
<*comment—server listed first, followed by type of server, followed by priority selection. lower number used first*>
Server A, mail server, 1
Server B, mail server, 2
Server C, mail server, 3
ConfigFile.ini
<*comment—shows entries for partial database that have been created when a primary server failed*>
<*mail file name, backup server used*>
client1mail.box, Server A
client2mail.box, Server A

EXAMPLE 2

Using the same files, Prioritylist.ini is a file that contains which database servers are available to act as backup. It also contains in this example the identification of the selected backup server(s), i.e., the location of newly created partial databases as needed after failure of Server C. In this example text file, location of newly created partial database are indicated by which server they are listed under.

PriorityList.ini
<*comment—server listed first, followed by type of server, followed by priority selection. lower number used first*>
ServerA, mail server, 1
client1mail.box, ServerA
client2mail.box, ServerA
ServerB, mail server, 2
ServerC, mail server, 3

As noted, FIG. 5 depicts one embodiment of proactive database structure creation logic to be employed responsive to selection of a server to function as database service backup for a failing server of a computing environment. This logic begins 500 by inquiring whether proactive database structure creation is enabled 510. If "no", then processing is complete 520. Assuming that proactive database structure creation is enabled, then the logic determines whether backup database structure creation rollout is enabled. Rollout enabled means that there is a rollout schedule for proactive creation of database structures on the selected server(s). If so, then backup database structures are created on the selected database server according to the rollout schedule 540, after which proactive database structure creation is complete 520. A rollout schedule advantageously prevents a large number of database structures from being created simultaneously at the selected server. Using the rollout schedule, different database structures can be created at different times as desired.

If database structure rollout is not enabled, then the logic determines whether there is a backup database structure priority list enabled 550. If "yes", then backup database structures are created based on priority rankings within the priority list of database structures 560. For instance, in the embodiment depicted, database structures with high priority are proactively created at a server responsive to selection of the server to function as database service backup of the failing server. After the high priority database structures have been created, then the processing of FIG. 5 is complete 520.

As a further variation, employable with either the rollout schedule approach, or the backup database structure priority list approach, the proactive creation logic could restrict the dynamic creation of database structures at the selected server to a percentage of computing resources available at any point in time. For example, creation of database structures at the selected server may be limited to twenty percent of the resources available at the associated computing unit.

Figure 6:
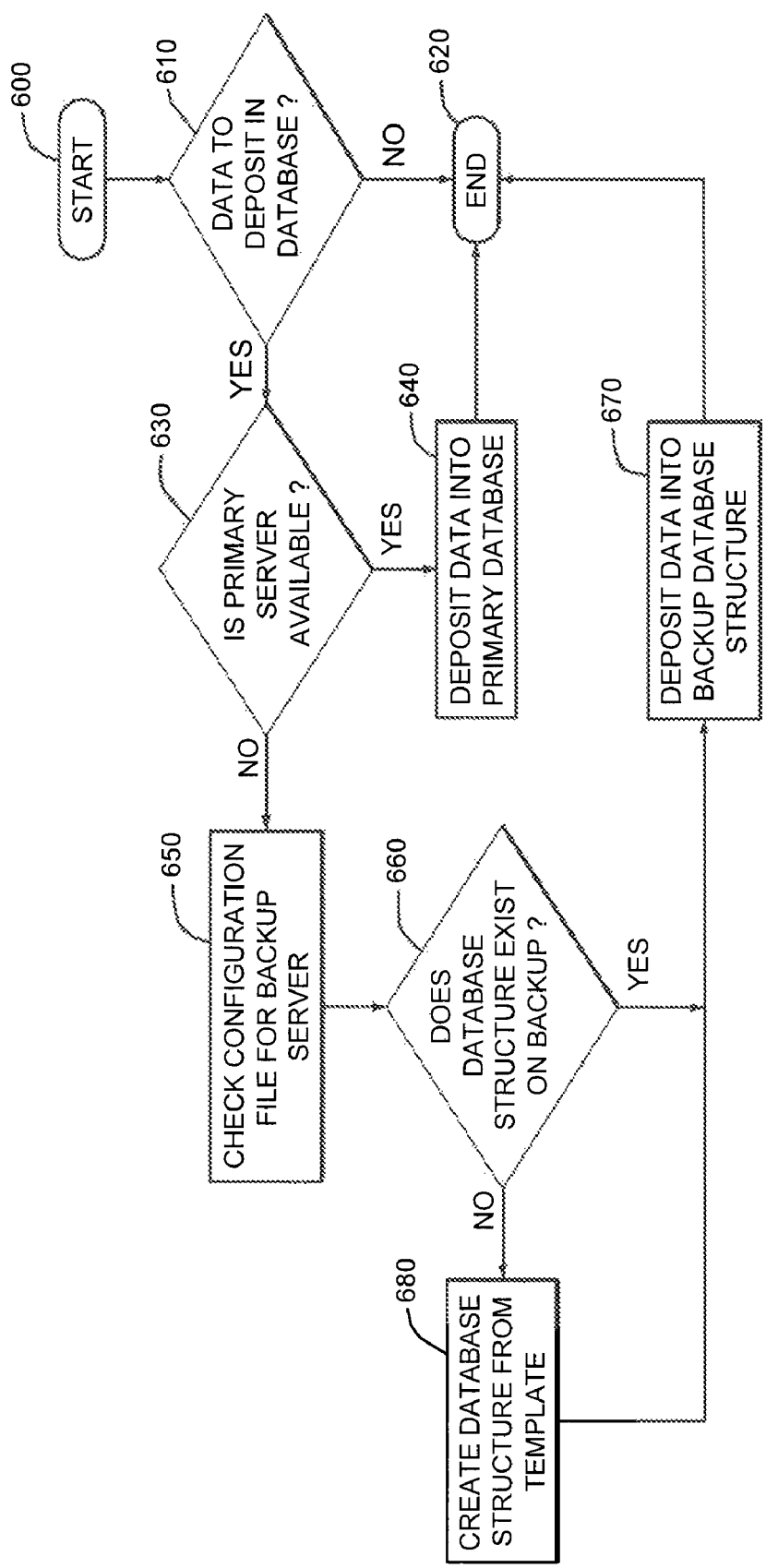
FIG. 6 depicts one embodiment of logic for depositing data, including dynamically creating (when necessary) at least one database structure at the another server into which the data is to be deposited, in accordance with one or more aspects of the present invention.

FIG. 6 depicts one embodiment of logic for depositing database data, including dynamically creating at least one database structure into which the data is to be temporarily deposited, in accordance with an aspect of the present invention. This logic begins 600 with determining whether data exists that is to be deposited into a database supporting the database service at issue 610. If "no", then processing terminates 620. If "yes", then the logic determines whether the primary server providing the database service is available 630, and if so, the data is deposited into the primary database supporting the database service at the primary server 640, after which processing ends 620.

If the primary server is unavailable, e.g., has failed, then the logic checks the updated configuration file for the identity of the selected backup server(s) 650. Inquiry is made whether the database structure needed to deposit the data exists on a selected backup server 660. If "yes", then the data is deposited in the appropriate backup data structure 670, and processing is complete 620. If the needed data structure to deposit the data does not exist on the selected server, e.g., has not been proactively created, or has not been created responsive to a prior depositing of data, then the logic creates the needed database structure from a template 680. The template is predefined so that the database structure created corresponds to (e.g., is a mirror image of) a database structure of the primary database at the failing server. By way of example, the database structure might comprise an electronic mail file or record for a particular client or user of the computing environment.

Figure 7:
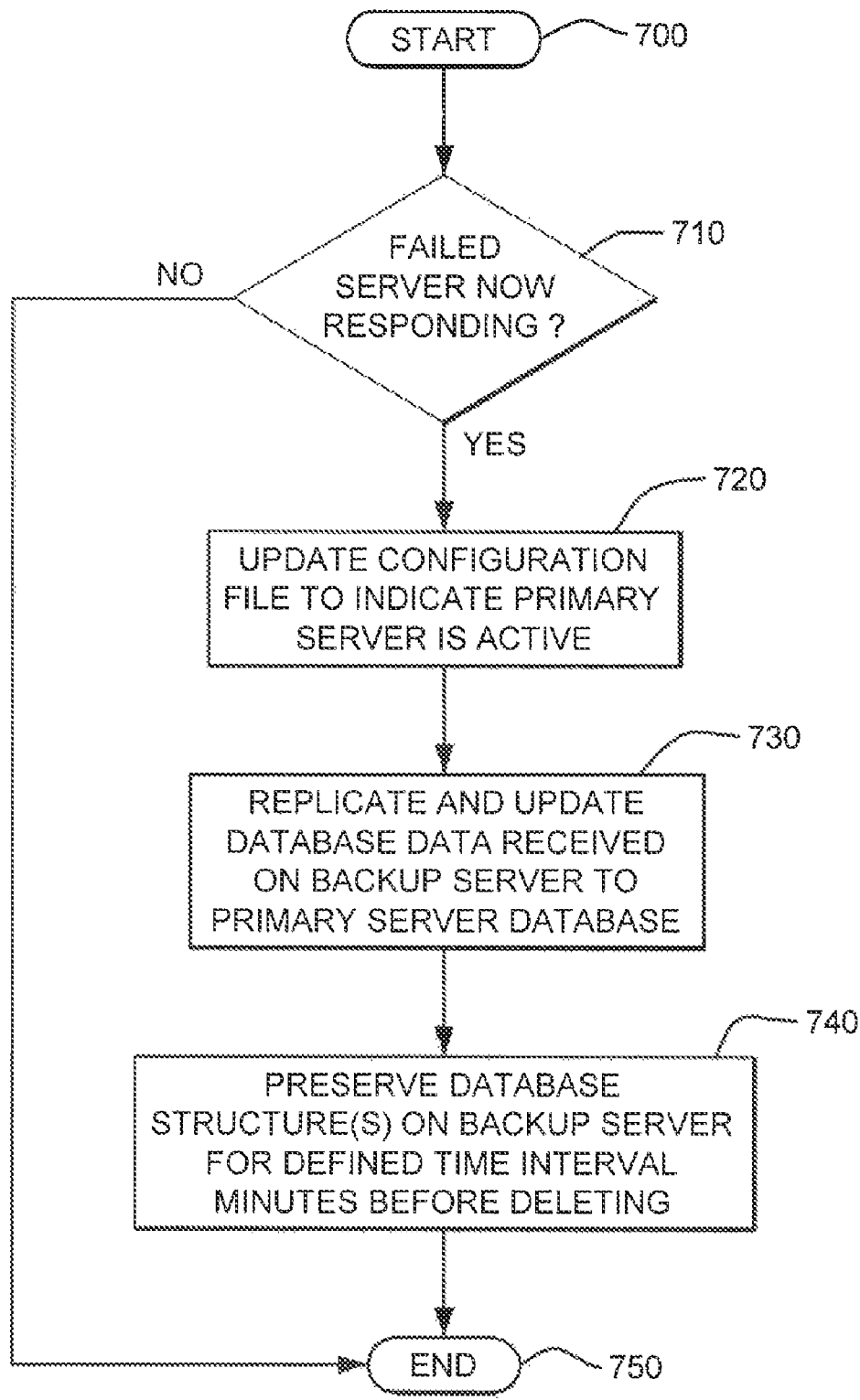
FIG. 7 depicts one embodiment of logic for server recovery handling, in accordance with one or more aspects of the present invention.

FIG. 7 depicts one embodiment of logic for server recovery handling. This process begins 700 with determining whether the failed server is now responding, i.e., is now operational, 710. If "no", then the process is complete 750. If the original, primary server is now responding, then the configuration file is updated to indicate that the primary server providing the database service is now active 720. Any data held in the partial database structure(s) of the selected backup server(s) is then replicated into the primary database of the primary server supporting the database service 730. The database structures created on the selected backup server may be preserved for a defined time interval before being automatically deleted 740 to address a situation where a failing primary server becomes operational, and then re-fails. This completes the recovery processing 750.

By way of further example, one detailed embodiment of the concepts presented herein is described below with reference to an electronic mail database service, and more particularly, to sending or receiving data for deposition into an e-mail IN box. Advantageously, in this example, the one or more data structures, (e.g., electronic mail files (IN boxes only)), are automatically created on the selected server upon a need basis only. This means that a new inbox is created on the another server after failure at the primary server either: (1) the first time a user sends a mail item to be deposited into that IN box;

(2) the first time another user sends a mail item to the IN box of that user; or (3) the first time that the mail user attempts to check his/her corresponding IN box.

In the following example, consider any e-mail client, and any e-mail system including two or more mail servers, e.g., server A, server B and server C. Further, it is assumed that a server outage on server A occurs, and all users on server A have no availability, i.e., no way to send or receive e-mail, until server A is restarted and healthy.

The purpose of each new mail file (i.e., database structure) in this example is to act as a Inbox/Sent folder for supporting e-mail services. The approach described herein allows users to receive new mail and/or send out mail when their primary server is down. The corresponding mail files will enable each user on the down server to continue working. One specific implementation (e.g., implementable in Lotus Notes, Microsoft Outlook, POP3 mail clients, IMAP mail clients, etc.) follows.

1. A priority list of failover servers is maintained on each server for each database. This priority list indicates which failover server(s) could be used for each database service if the primary database server fails. The list may include one or more servers, to provide failover capabilities in the case of multiple server failures. Additionally, the priority list includes load balancing to ensure that if a server fails, the partial replicas will be evenly distributed across other database servers. Load balancing could be as simple as distributing the workload evenly, or as complex as communicating with a performance tool to disperse the load to the server with the most CPU power available.

2. Upon server failure, the unresponsive primary server is detected by either the client system, or other servers or by system probe devices.

3. Once detected, a client system accesses the priority list, e.g., from an available server for each database that needs to be accessed. The client system proceeds to probe the priority list in descending order until the first available database server is discovered. A configuration file entry matching this server/database subset is created and propagated to all other available servers via the one or more configuration files. This temporary location document allows servers to appropriately route mail and other documents.

4. A partial database replica is created as needed on the appropriate failover server for each database. This partial replica is a lightweight replica of the database design components, i.e., database structures, without any documents, agents, or other components. This partial replica is created based off the design elements of a template, or can simply be a repository of documents that can be accessed, but not viewed on the server.

To provide even more stringent DASD and resource savings, configurable settings could allow this process to take place only upon a failure of great severity, e.g., one lasting over a predefined time interval, or only for particular databases, or many other options. These are implementation details that can be worked out via system administrator configuration.

5. Users can then access their new mail from the partial replicas. While not required, a local replica can be maintained to supply access to historic documents that are already created, while the partial replica only stores new documents and mail that arrives.

6. Upon the primary server becoming operational, the appropriate documents from the partial replicas are replicated to the primary database, the temporary location documents are removed, and service resumes as normal. The partial replicas can be automatically deleted immediately, or can remain for an amount of time to be ready in case of another rapid failure of the primary server. Additionally, the documents of the partial replicas could be deleted, while leaving the partial replica stub for a further period of time.

Advantageously, the solution presented herein saves CPU, memory, and DASD while still providing a high availability solution for collaborative databases. It allows users to seamlessly continue accessing and editing documents, even when the primary server goes down, and is ideal for small and medium businesses which do not have the budget to create full clusters for all servers.

The value here is availability. Near 100% uptime, yet it is limited availability, i.e., no historic mail at this point. In this solution, there is no need for the full cluster. A local database copy is only needed to access the historical data to supplement the new data, which the present invention would seamlessly combine so that the location of all data is transparent to the user.

Many businesses do not have enough resources for full clustered support. While the cost of hardware continues to decrease, the amount of hardware needed increases due to more data, as do the complexity of the software clustering solutions (requiring additional administration labor dollars). As a result, there will remain businesses which cannot afford full clustering solutions.

The overall focus of this invention is availability. In IT, availability is everything. This is a low cost, high availability solution.

The detailed description presented above is discussed in terms of program procedures executed on a computer, a network or a cluster of computers. These procedural descriptions and representations are used by those skilled in the art to most effectively convey the substance of their work to others skilled in the art. They may be implemented in hardware or software, or a combination of the two.

A procedure is here, and generally, conceived to be a sequence of steps leading to a desired result. These steps are those requiring physical manipulations of physical quantities. Usually, though not necessarily, these quantities take the form of electrical or magnetic signals capable of being stored, transferred, combined, compared, and otherwise manipulated. It proves convenient at times, principally for reasons of common usage, to refer to these signals as bits, values, elements, symbols, characters, terms, numbers, objects, attributes or the like. It should be noted, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary, or desirable in most cases, in any of the operations described herein which form part of the present invention; the operations are automatic machine operations. Useful machines for performing the operations of the present invention include general purpose digital computers or similar devices.

Each step of the method may be executed on any general computer, such as a mainframe computer, personal computer or the like and pursuant to one or more, or a part of one or more, program modules or objects generated from any programming language, such as C++, Java, Fortran or the like. And still further, each step, or a file or object or the like implementing each step, may be executed by special purpose hardware or a circuit module designed for that purpose.

Aspects of the invention are preferably implemented in a high level procedural or object-oriented programming language to communicate with a computer. However, the inventive aspects can be implemented in assembly or machine language, if desired. In any case, the language may be a compiled or interpreted language.

The invention may be implemented as a mechanism or a computer program product comprising a recording medium. Such a mechanism or computer program product may include, but is not limited to CD-ROMs, diskettes, tapes, hard drives, computer RAM or ROM and/or the electronic, magnetic, optical, biological or other similar embodiment of the program. Indeed, the mechanism or computer program product may include any solid or fluid transmission medium, magnetic or optical, or the like, for storing or transmitting signals readable by a machine for controlling the operation of a general or special purpose programmable computer according to the method of the invention and/or to structure its components in accordance with a system of the invention.

The invention may also be implemented in a system. A system may comprise a computer that includes a processor and a memory device and optionally, a storage device, an output device such as a video display and/or an input device such as a keyboard or computer mouse. Moreover, a system may comprise an interconnected network of computers. Computers may equally be in stand-alone form (such as the traditional desktop personal computer) or integrated into another environment (such as a partially clustered computing environment). The system may be specially constructed for the required purposes to perform, for example, the method steps of the invention or it may comprise one or more general purpose computers as selectively activated or reconfigured by a computer program in accordance with the teachings herein stored in the computer(s). The procedures presented herein are not inherently related to a particular computing environment. The required structure for a variety of these systems will appear from the description given.

Again, the capabilities of one or more aspects of the present invention can be implemented in software, firmware, hardware or some combination thereof.

One or more aspects of the present invention can be included in an article of manufacture (e.g., one or more computer program products) having, for instance, computer usable media. The media has therein, for instance, computer readable program code means or logic (e.g., instructions, code, commands, etc.) to provide and facilitate the capabilities of the present invention. The article of manufacture can be included as a part of a computer system or sold separately.

Additionally, at least one program storage device readable by a machine embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A system for transitioning a database service from a failing server to another server of a computing environment comprising a plurality of servers, the system comprising:

a processor and a memory;

means, responsive to detecting failure at a primary server of the computing environment providing a database service, and without pre-requiring any server of the computing environment to function as backup to the primary server, for selecting another server of the computing environment to function as database service backup for the primary, failing server, wherein the another server lacks a mirrored copy of a database supporting the database service at the primary, failing server, and lacks access to the database supporting the database service at the primary, failing server;

means for updating at least one configuration file of the computing environment to indicate that the another service is to function as database service backup for the primary, failing server; and means for dynamically creating by the another server, subsequent to the selecting of the another server, at least one database data repository structure at the another server, the dynamically created at least one database data repository structure supporting the database service backup function at the another server by receiving data therein, and the at least one database data repository structure corresponding to at least one database data repository structure of a database supporting the database service function at the primary server, wherein the data received into the dynamically created at least one database data repository structure was directed to the corresponding at least one database data repository structure of the database supporting the database service function at the primary server.

2. The system of claim 1, wherein the means for selecting of the another server comprises means for employing a predefined priority list of servers of the computing environment having ability to provide the database service function, the means for employing comprising means for identifying a highest priority, currently available server in the predefined priority list of servers as the another server and verifying that the another server can handle anticipated processing load resulting from functioning as database service backup for the primary server.

3. The system of claim 1, wherein the means for dynamically creating comprises means for proactively creating multiple database data repository structures at the another server to facilitate database service backup, the proactively creating occurring prior to receipt of data at the another server to be deposited into one of the multiple database data repository structures.

4. The system of claim 3, wherein the means for proactively creating comprises means for proactively creating multiple database data repository structures for supporting the database service at the another server according to a predefined database data repository structure rollout schedule.

5. The system of claim 3, wherein the means for proactively creating comprises means for proactively creating multiple database data repository structures for supporting the database service at the another server according to a predefined list of backup database data repository structure priorities for supporting the database service.

6. The system of claim 1, further comprising responsive to existence of data to be deposited into the at least one database data repository structure at the primary, failing server, means for checking the at least one configuration file of the computing environment to identify the another server functioning as database service backup for the primary, failing server, and for receiving the data at the another server for deposit into the dynamically created at least one database data repository structure, and for temporarily storing the data in the at least one database data repository structure at the another server functioning as database service backup for the primary structure at the another server functioning as database service backup for the primary server only while the primary server remains failing.

7. The system of claim 6, wherein the means for dynamically creating comprises means for employing a predefined template for at least one database data repository structure of the database at the primary, failing server in dynamically creating at least one corresponding database data repository structure at the another server, the predefined template being employed to dynamically create the at least one corresponding database data repository structure at the another server.

8. The system of claim 1, further comprising a means for transitioning the database service back to the primary server once operational, the means for transitioning back comprising means for updating the at least one configuration file of the computing environment to indicates that the primary server is now operational, means for updating the database at the primary server by copying deposited data in the at least one database data repository structure of the another server into the corresponding at least one database data repository structure of the database at the now operational primary server, and means for preserving the at least one database data repository structure of the another server for a predefined time interval before automatically deleting the at least one database data repository structure of the another server.

9. At least one program storage device readable by a computer, tangibly embodying at least one program of instructions executable by the computer to perform a method of transitioning a database service from a failing server to another server of a computing environment comprising a plurality of servers, the method comprising:
responsive to detecting failure at a primary server of the computing environment providing a database service, and without pre-requiring any server of the computing environment to function as backup to the primary server, selecting another server of the computing environment to function as database service backup for the primary, failing server, wherein the another sever lacks a mirrored copy of a database supporting the database service at the primary, failing server, and lacks access to the database supporting the database service at the primary, failing server;
updating at least one configuration file of the computing environment to indicate that the another server is to function as database service backup for the primary, failing server; and
subsequent to the selecting of the another server, dynamically creating by the another server at least one database data repository structure at the another server, the dynamically created at least one database data repository structure supporting the database service backup function at the another server by receiving data therein, and the at least one database data repository structure corresponding to at least one database data repository structure of a database supporting the database service function at the primary server, wherein the data received into the dynamically created at least one database data repository structure was directed to the corresponding at least one database data repository structure of the database supporting the database service function at the primary server.

10. The at least one program storage device of claim 9, wherein the selecting of the another server comprises employing a predefined priority list of servers of the computing environment having ability to provide the database service function, the employing comprising identifying a highest priority, currently available server in the predefined priority list of servers as the another server and verifying that the another server can handle anticipated processing load resulting from functioning as database service backup for the primary server.

11. The at least one program storage device of claim 9, wherein the dynamically creating comprises proactively creating multiple database data repository structures at the another server to facilitate database service backup for multiple clients of the database service of the primary, failing server, the proactively creating occurring prior to receipt of data at the another server to be deposited into one of the multiple database data repository structures.

12. The at least one program storage device of claim 9, further comprising responsive to existence of data to be deposited into the at least one database data repository structure at the primary, failing server, checking the at least one configuration file of the computing environment to identify the another server functioning as database service backup for the primary server, and receiving the data at the another server for deposit into the dynamically created at least one database data repository structure, and temporarily storing the data in the at least one database data repository structure at the another server functioning as database service backup for the primary server only while the primary server remains failing.

13. The at least one program storage device of claim 12, wherein the dynamically creating is responsive to the existence of the data to be deposited, and wherein the dynamically creating of the at least one database data repository structure comprises employing a predefined template for the corresponding at least one database data repository structure of the database at the primary, failing server, the predefined template being employed to dynamically create the at least one database data repository structure at the another server.

14. The at least one program storage device of claim 9, further comprising a step of transitioning the database service back to the primary server once operational, the step of transitioning back comprising updating the at least one configuration file of the computing environment to indicate that the primary server is now operational, updating the database at the primary server by copying deposited data in the at least one database data repository structure of the another server into the corresponding at least one database data repository structure of the database at the now operational primary server, and preserving the at least one database data repository structure of the another server for a predefined time interval before automatically deleting the at least one database data repository structure of the another server.

* * * * *